(12) United States Patent
Lei

(10) Patent No.: US 11,941,926 B2
(45) Date of Patent: Mar. 26, 2024

(54) VEHICLE VARIATION REMEDIATION

(71) Applicant: Ford Global Technologies, LLC, Dearborn, MI (US)

(72) Inventor: Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 17/393,604

(22) Filed: Aug. 4, 2021

(65) Prior Publication Data
US 2023/0045203 A1 Feb. 9, 2023

(51) Int. Cl.
*G07C 5/08* (2006.01)
*G06F 8/65* (2018.01)
*G06F 8/71* (2018.01)
*G07C 5/00* (2006.01)

(52) U.S. Cl.
CPC ............ *G07C 5/0833* (2013.01); *G06F 8/65* (2013.01); *G06F 8/71* (2013.01); *G07C 5/008* (2013.01)

(58) Field of Classification Search
CPC ......... G07C 5/0833; G07C 5/008; G06F 8/65; G06F 8/71
See application file for complete search history.

(56) References Cited

U.S. PATENT DOCUMENTS

| | | | | |
|---|---|---|---|---|
| 9,557,981 B2* | 1/2017 | Throop | ................ | G06F 8/654 |
| 10,279,816 B2* | 5/2019 | Jiang | ................ | G07C 5/0808 |
| 10,553,046 B2 | 2/2020 | Thron et al. | | |
| 10,621,800 B2* | 4/2020 | Ouchida | ................ | A01D 41/127 |
| 10,875,502 B2 | 12/2020 | Fischer et al. | | |
| 11,187,793 B1* | 11/2021 | Liu | ................ | G05D 1/0214 |
| 11,428,606 B2* | 8/2022 | Kain Venkatadri | .. | G07C 5/0808 |
| 11,575,699 B2* | 2/2023 | Haga | ................ | G07C 5/0808 |
| 2008/0291014 A1 | 11/2008 | Chigusa et al. | | |
| 2009/0306841 A1* | 12/2009 | Miwa | ................ | B60L 53/24 |
| | | | | 701/31.4 |
| 2010/0120373 A1* | 5/2010 | Wheatley | ................ | H04L 12/40006 |
| | | | | 701/36 |
| 2010/0161546 A1* | 6/2010 | Yamada | ................ | G06N 5/04 |
| | | | | 706/54 |
| 2010/0211643 A1* | 8/2010 | Lowenthal | ................ | B60L 53/14 |
| | | | | 709/206 |
| 2011/0071724 A1* | 3/2011 | Heine | ................ | G07C 5/008 |
| | | | | 701/31.4 |
| 2014/0121888 A1 | 5/2014 | Guo et al. | | |
| 2015/0128123 A1* | 5/2015 | Eling | ................ | G07C 5/008 |
| | | | | 717/171 |
| 2015/0134192 A1* | 5/2015 | Kakinuma | ................ | B60W 50/04 |
| | | | | 701/31.4 |

(Continued)

*Primary Examiner* — Angelina Shudy
(74) *Attorney, Agent, or Firm* — Brandon Hicks; Bejin Bieneman PLC

(57) ABSTRACT

A vehicle computer can be programmed to detect, in a vehicle, one of a plurality of variations, based on data received from one or more vehicle sensors or a vehicle interface, to transmit, to a remote computer, variation data including the detected variation and a version of software in the vehicle computer, wherein the variation data identifies the detected variation and the version of the software, to receive, from the remote computer, a response including that a software update is identified based on the detected variation, and upon identifying the software update, to download and install the software update in the vehicle computer.

15 Claims, 4 Drawing Sheets

(56) References Cited

U.S. PATENT DOCUMENTS

| | | | |
|---|---|---|---|
| 2015/0227359 A1* | 8/2015 | Todoroki | H04M 1/72406 717/169 |
| 2015/0243110 A1* | 8/2015 | Lee | G07C 5/008 701/31.4 |
| 2015/0254127 A1* | 9/2015 | Matthews | G06F 11/0748 714/2 |
| 2015/0331686 A1 | 11/2015 | Petersen et al. | |
| 2015/0378715 A1* | 12/2015 | Solnit | G06F 8/656 713/2 |
| 2017/0118573 A1* | 4/2017 | Yae | H04W 4/40 |
| 2017/0242678 A1* | 8/2017 | Sangameswaran | G06F 8/65 |
| 2017/0242679 A1* | 8/2017 | Sangameswaran | G06F 8/65 |
| 2017/0270490 A1* | 9/2017 | Penilla | G07C 5/006 |
| 2017/0345231 A1* | 11/2017 | Kumabe | H04W 4/30 |
| 2018/0147721 A1* | 5/2018 | Griffin | A47L 9/2852 |
| 2018/0268719 A1* | 9/2018 | Guan | G08G 5/0056 |
| 2018/0342113 A1* | 11/2018 | Kislovskiy | G07C 5/008 |
| 2019/0108010 A1* | 4/2019 | Tillman | H04L 67/12 |
| 2019/0193747 A1* | 6/2019 | Golov | B60W 50/0205 |
| 2019/0212997 A1* | 7/2019 | Sangameswaran | H04L 67/52 |
| 2020/0051347 A1* | 2/2020 | Bohl | G06Q 10/04 |
| 2020/0110406 A1* | 4/2020 | Krishnamurthy | G05D 1/0061 |
| 2020/0133259 A1* | 4/2020 | Van Wiemeersch | B60W 50/029 |
| 2020/0175782 A1* | 6/2020 | Tokman | G07C 5/085 |
| 2020/0209002 A1* | 7/2020 | Hou | G05D 1/0088 |
| 2020/0233655 A1* | 7/2020 | Watanabe | H04L 67/12 |
| 2020/0364950 A1* | 11/2020 | Bachant | G06F 16/285 |
| 2021/0049836 A1* | 2/2021 | Covington | G07C 5/085 |
| 2021/0158639 A1* | 5/2021 | Westra | H04L 9/3271 |
| 2021/0191391 A1* | 6/2021 | Menon | B64C 11/46 |
| 2021/0326127 A1* | 10/2021 | Hieb | B64C 39/024 |
| 2021/0335062 A1* | 10/2021 | Claessens | G06N 20/00 |
| 2022/0005121 A1* | 1/2022 | Hayward | G06N 3/044 |
| 2022/0068051 A1* | 3/2022 | Krishnamurthy | G05B 23/0283 |
| 2022/0340119 A1* | 10/2022 | Karunaratne | G07C 5/008 |
| 2022/0402511 A1* | 12/2022 | Choi | B60W 50/0205 |
| 2023/0186691 A1* | 6/2023 | Shui | G07C 5/0816 701/31.4 |
| 2023/0267776 A1* | 8/2023 | Yano | G06F 11/07 701/29.1 |
| 2023/0282039 A1* | 9/2023 | Duan | G07C 5/0808 701/31.4 |
| 2023/0343146 A1* | 10/2023 | Jung | G06F 11/079 |

* cited by examiner

VEHICLE VARIATION REMEDIATION

BACKGROUND

A vehicle system may include multiple computers, electronic controllers, actuators, and/or sensors. A vehicle system may behave in a manner not expected by a vehicle user.

DETAILED DESCRIPTION

Figure 1:
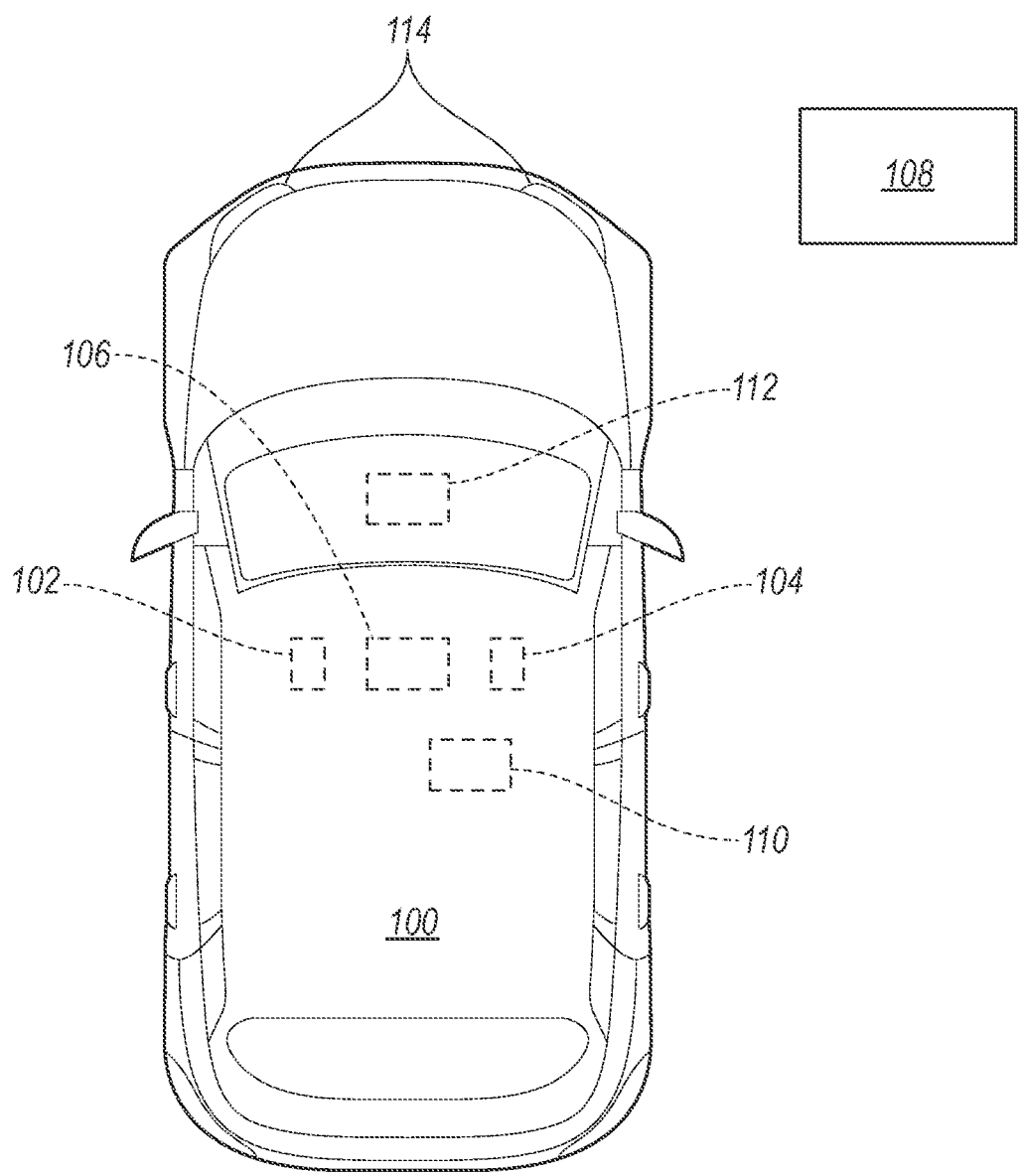
FIG. 1 shows an example vehicle.

A vehicle system typically includes multiple electronic components, e.g., computers, electronic control units (ECUs), sensors, etc. A vehicle and/or vehicle systems can vary from expected behaviors. A variation in the context of this document means behavior of a vehicle system or component thereof that is outside of one or more specified parameters for operation of the system and/or component. A variation can cause a vehicle to operate in an unexpected manner. As disclosed herein, a variation can be detected and addressed by updating vehicle one or more vehicle system controllers, thereby improving vehicle operation.

A vehicle computer may be programmed to detect a variation in a vehicle or vehicle system from data received from one or more vehicle sensors or input received from a vehicle interface, e.g., a touch screen. The vehicle computer may then transmit the variation data to a remote computer. The vehicle computer may then receive a response from a remote computer including a software update that is identified for remediating the detected variation. The vehicle computer may download and install the software update in the vehicle computer.

An example system comprises a vehicle computer including a processor and a memory, the memory storing instructions executable by the processor to: detect, in a vehicle, one of a plurality of variations, based on data received from one or more vehicle sensors or a vehicle interface; transmit, to a remote computer, variation data including the detected variation and a version of software in the vehicle computer, wherein the variation data identifies the detected variation and the version of the software; receive, from the remote computer, a response including that a software update is identified based on the detected variation; and upon identifying the software update, download and install the software update in the vehicle computer.

The response can further include data specifying a directive to output audio or visual data to the vehicle interface.

The instructions can further include instructions to receive variation definition data, from the remote computer, defining the plurality of variations. A variation can specify an unexpected operation of one or more components of the vehicle without a specified diagnostic trouble code. The plurality of variations can include one or more of (i) a start-stop operation fails to restart a vehicle engine, (ii) the vehicle fails to establish wireless communication with a user device in the vehicle, or (iii) a poor audio quality of a vehicle loudspeaker is detected.

The instructions can further include instructions to: receive data, from a vehicle user interface, specifying a new variation including audio or textual data received via a user interface; and transmit the received audio or textual data, vehicle data, and environmental data to the remote computer; wherein the remote computer is programmed to transmit an update of the variation definition data based on the received data, wherein the vehicle data includes data received from one or more vehicle sensors, actuators, or computers specifying a vehicle operation at a time of reporting the new variation. The vehicle data can further include a software version of one or more vehicle computers.

The remote computer can be programmed, upon receiving the variation data from the vehicle computer, to determine whether a software update or a pending software update is available based on a list of stored variations and respective software updates.

The instructions can further include instructions to receive the response including that no software update is identified based on the detected variation.

The response further can further include data specifying a pending software update for the detected variation and/or data specifying an instruction to actuate one or more vehicle actuators including actuating a hazard light to flash or to limit a maximum vehicle speed.

A method can comprise: detecting, in a vehicle, one of a plurality of variations, based on data received from one or more vehicle sensors or a vehicle interface; transmitting, to a remote computer, variation data including the detected variation and a version of software in the vehicle computer, wherein the variation data identifies the detected variation and the version of the software; receiving, from the remote computer, a response including that a software update is identified based on the detected variation; and upon identifying the software update, downloading and installing the software update in the vehicle computer.

The response can further include data specifying a directive to output audio or visual data to the vehicle interface.

The method can further comprise receiving variation definition data, from the remote computer, defining the plurality of variations. A variation can specify an unexpected operation of one or more components of the vehicle without a specified diagnostic trouble code. The plurality of variations can include one or more of (i) a start-stop operation fails to restart a vehicle engine, (ii) the vehicle fails to establish wireless communication with a user device in the vehicle, or (iii) a poor audio quality of a vehicle loudspeaker is detected.

The method can further comprise receiving data, from a vehicle user interface, specifying a new variation including audio or textual data received via a user interface; and transmitting the received audio or textual data, vehicle data, and environmental data to the remote computer; wherein the remote computer is programmed to transmit an update of the variation definition data based on the received data, wherein the vehicle data includes data received from one or more vehicle sensors, actuators, or computers specifying a vehicle operation at a time of reporting the new variation.

The remote computer can be programmed, upon receiving the variation data from the vehicle computer, to determine whether a software update or a pending software update is available based on a list of stored variations and respective software updates.

The response further can further include data specifying a pending software update for the detected variation and/or data specifying an instruction to actuate one or more vehicle actuators including actuating a hazard light to flash or to limit a maximum vehicle speed.

A vehicle 100 may be any suitable type of ground vehicle 100, e.g., a passenger or commercial automobile such as a sedan, a coupe, a truck, a sport utility, a crossover, a van, a minivan, a taxi, a bus, etc.

The vehicle computer 106 includes a processor and a memory. The memory includes one or more forms of computer readable media, and stores instructions executable by the vehicle computer 106 for performing various operations, including as disclosed herein. For example, the computer can be a generic computer with a processor and memory as described above and/or may include an electronic control unit ECU or controller for a specific function or set of functions, and/or a dedicated electronic circuit including an ASIC (Application-Specific Integrated Circuit) that is manufactured for a particular operation, e.g., an ASIC for processing sensor 102 data and/or communicating the sensor 102 data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer. In the present context, the vehicle computer 106 may be, for example, an ECU, and further techniques disclosed herein could be implemented in more than one vehicle ECU.

The memory can be of any type, e.g., hard disk drives, solid state drives, servers, or any volatile or non-volatile media. The memory can store the collected data sent from the sensors 102. The memory can be a separate device from the computer, and the computer can retrieve information stored by the memory via a network in the vehicle 100, e.g., over a CAN bus, a wireless network, etc. Alternatively or additionally, the memory can be part of the computer, e.g., as a memory of the computer.

The computer may include programming to operate one or more of vehicle 100 brakes, propulsion e.g., control of acceleration in the vehicle 100 by controlling one or more of an internal combustion engine, electric motor, hybrid engine, etc., steering, climate control, interior and/or exterior lights 114, etc., as well as to determine whether and when the computer, as opposed to a human operator, is to control such operations. Additionally, the computer may be programmed to determine whether and when a human operator is to control such operations. The computer may include or be communicatively coupled to, e.g., via a vehicle 100 network such as a communications bus as described further below, more than one processor, e.g., included in components such as sensors 102, electronic control units (ECUs) or the like included in the vehicle 100 for monitoring and/or controlling various vehicle components, e.g., a powertrain controller, a brake controller, a steering controller, etc. The computer is generally arranged for communications on a vehicle 100 communication network that can include a bus in the vehicle 100 such as a controller area network CAN or the like, and/or other wired and/or wireless mechanisms. Alternatively or additionally, in cases where the computer actually comprises a plurality of devices, the vehicle 100 communication network may be used for communications between devices represented as the computer in this disclosure. Further, as mentioned below, various controllers and/or sensors 102 may provide data to the computer via the vehicle 100 communication network.

A remote computer 108 includes a processor and a memory. The memory includes one or more forms of computer readable media, and stores instructions executable by the remote computer 108 for performing various operations, including as disclosed herein.

Vehicles 100, such as autonomous or semi-autonomous vehicles 100, typically include a variety of sensors 102. A sensor 102 is a device that can obtain one or more measurements of one or more physical phenomena. Some sensors 102 detect internal states of the vehicle 100, for example, wheel speed, wheel orientation, and engine and transmission variables. Some sensors 102 detect the position or orientation of the vehicle 100, for example, global positioning system GPS sensors 102; accelerometers such as piezoelectric or microelectromechanical systems MEMS; gyroscopes such as rate, ring laser, or fiber-optic gyroscopes; inertial measurements units IMU; and magnetometers. Some sensors 102 detect the external world, for example, radar sensors 102, scanning laser range finders, light 114 detection and ranging LIDAR devices, and image processing sensors 102 such as cameras. A LIDAR device detects distances to objects by emitting laser pulses and measuring the time of flight for the pulse to travel to the object and back. Some sensors 102 are communications devices, for example, vehicle-to-infrastructure V2I or vehicle-to-vehicle V2V devices. Sensor 102 operation can be affected by obstructions, e.g., dust, snow, insects, etc. Often, but not necessarily, a sensor 102 includes a digital-to-analog converter to converted sensed analog data to a digital signal that can be provided to a digital computer, e.g., via a network. Sensors 102 can include a variety of devices, and can be disposed to sense and environment, provide data about a machine, etc., in a variety of ways. For example, a sensor 102 could be mounted to a stationary infrastructure element on, over, or near a road. Moreover, various controllers in a vehicle 100 may operate as sensors 102 to provide data via the vehicle 100 network or bus, e.g., data relating to vehicle 100 speed, acceleration, location, subsystem and/or component status, etc. Further, other sensors 102, in or on a vehicle 100, stationary infrastructure element, etc., infrastructure could include cameras, short range radar, long range radar, LIDAR, and/or ultrasonic transducers, weight sensors 102, accelerometers, motion detectors, etc., i.e., sensors 102 to provide a variety of data. To provide just a few non-limiting examples, sensor 102 data could include data for determining a position of a component, a location of an object, a speed of an object, a type of an object, a slope of a roadway, a temperature, and presence or amount of moisture, a fuel level, a data rate, etc.

The actuators 110 may be implemented via circuits, chips, or other electronic components that can actuate various vehicle 100 subsystems in accordance with appropriate control signals as is known. The actuators 110 may be used to control braking, acceleration, and steering of the vehicle 100. As an example, the vehicle computer 106 may output control instructions to control the actuators 110.

A loudspeaker, or speaker 104, is a device that, as is well known, can convert an electrical signal to sound, i.e., a speaker 104 can include a transducer that converts the electric signal to vibrations to generate sound at a desired frequency. A speaker 104 can receive the electrical signal from an audio amplifier.

A vehicle interface 112 (or human-machine interface) may include one or more of a display, a touchscreen display, a microphone, a loudspeaker, etc. The user can provide input to devices such as the vehicle computer 106 via the vehicle interface 112. The vehicle interface 112 can communicate with the vehicle computer 106 via the vehicle 100 network, e.g., the vehicle interface 112 can send a message including the user input provided via a touchscreen, microphone, a camera that captures a gesture, etc., to a vehicle computer 106, and/or can display output, e.g., via a screen, loudspeaker, etc. The vehicle 100 may include multiple lights 114 mounted in the interior or on the exterior of the vehicle 100, e.g., headlight, taillight, blinker, etc. A vehicle computer 106 may be programmed to actuate one or more lights 114 to turn on, turn off, or flash.

A vehicle computer 106 can be programmed to detect a variation in a vehicle 100 based on data received from a vehicle 100 sensor 102 or a vehicle interface 112. A detected variation can be one of a plurality of predefined variations as discussed below with reference to Table 1. The vehicle computer 106 can then transmit to a remote computer 108, variation data including the detected variation and a version of software in the vehicle computer 106. The variation data identifies the detected variation and the version of the software. The vehicle computer 106 can be programmed to receive from the remote computer 108, a response including that a software update is identified based on the detected variation, and upon identifying the software update, download and install the software update in the vehicle computer 106. In some examples, the vehicle computer 106 may provide the data from the remote computer to one or more vehicle ECUs (or as mentioned above the vehicle computer 106 could be an ECU). A vehicle ECU may then download and update the ECU software based on the received data specifying the software update. In another example, the vehicle computer 106 may download the software update(s) and send the downloaded data to respective ECUs via a vehicle communication network.

To remediate an identified variation, the vehicle computer can be programmed to (i) output a directive, e.g., audio, video, textual data via the vehicle interface 112 directing a vehicle user to perform some action, (ii) identify a software update for the vehicle computer(s) 106, and/or (iii) actuate a vehicle component, e.g., turning on hazard lights 114.

A vehicle 100 variation specifies an unexpected operation of one or more components of the vehicle 100, and can be identified regardless of whether a vehicle system or component generates (and typically without) a diagnostic trouble code (DTC) or the like. DTCs typically specify a fault or malfunction of a system or a component, e.g., a sensor 102 not responding, a physical parameter such as oil temperature out of range, etc. However, a variation in the vehicle 100 may not be associated with a DTC. Table 1 below describes various example variations and explains these variations are different from faults indicated by DTCs. A variation could identify a fault or condition associated with a DTC, but more typically identifies an operation not associated with a DTC, but where the interaction of the components as a system results in an unexpected behavior such as examples listed in Table 1.

Variation definition data stored in a memory of the vehicle computer 106 specifies a list of variations that can be identified in the vehicle 100. The variation definition data specifies, for each variation, values of sensor data or conditions that might indicate a variation, such as temperature, vibrations, sounds, etc. The stored variation definition data in the vehicle computer 106 may further specify that upon detection of this variation, the vehicle computer 106 may output a message to the vehicle interface 112 describing the detected variation and download the software update. The respective actuation command may include activation of vehicle 100 hazard lights 114. Table 1 shows an exemplary set of variations and corresponding directive to user, software update, and/or any actuation command. For example, with respect to the first variation of Table 1, the vehicle computer 106 may receive data via a vehicle communication network such as a CAN bus which indicate an occurring of variations such as shown in Table 1, e.g., start-stop fails to restart engine, etc., and determine the first variation upon determining that the vehicle 100 does not start within a specified time after releasing the brake pedal although the engine was stopped by the start-stop function after recent pressing of the brake pedal. In this scenario, a DTC may not be generated because from the diagnostic software perspective, the start stop operation may be as expected, e.g., an engine temperature is below a threshold and therefore does not start the engine. Further in this example, a DTC may not be generated for an engine temperature sensor that is not functioning in an expected manner Nevertheless, not restarting the engine after being stopped by the start stop operation is an unexpected behavior. Thus, situation can be identifiable as a variation as long as the variation definition data specifies a general expectation from a start stop operation. A general expectation from an operation, e.g., start-stop, may be specified in multiple conditions or logical statements, e.g., if start stop functions stops the engine, a restart of engine is expected to occur automatically after a user releases the brake. For various functions, such expectations can be specified which lead to definition of variations, i.e., deviations from expected behavior(s).

TABLE 1

| Id | Variation Name | Variation definition | Directive to user | Software Update | Actuation Command |
| --- | --- | --- | --- | --- | --- |
| 1 | Start-stop fails to restart engine | Engine does not start when user releases the brake after an engine stop | Output message to user-software update needed to address start-stop issue | Software update version identifier | Turn on hazard lights 114 |
| 2 | Failure to establish communication with user devices | Multiple user devices, e.g., smart phone with enabled Bluetooth communication, are in the vehicle | Output a message to user-a software updated needed to address | Software version identifier | No actuation command |

TABLE 1-continued

| Id | Variation Name | Variation definition | Directive to user | Software Update | Actuation Command |
|---|---|---|---|---|---|
| | | 100 but vehicle computer 106 does not establish wireless communication with the user devices | pairing of user devices | | |
| 3 | Poor audio quality of vehicle 100 loudspeakers | A microphone of a vehicle interface 112 recognizes audio quality issues at the vehicle 100 speakers outputting audio data, e.g., noise detected in phone conversation played back at the vehicle 100 speakers | No directive | Pending software updated with expected date of release | Actuate vehicle 100 speaker 104 volume to reduce to 50%. |

The variation definition data, corresponding directives, identified software update, and/or actuation command may be received from a remote computer 108, e.g., at a service center. Thus, the vehicle computer 106 may be programmed to receive variation definition data, from the remote computer 108, defining multiple variations. In some examples, the vehicle computer 106 may store the variation definition data, send data specifying the detected variation to the remote computer 108, and receive data from the remote computer 108 specifying a directive to output audio or visual data to the vehicle interface 112, e.g., to provide guidance to a vehicle 100 user on how to handle the variation, and/or specify actuation command for vehicle 100 actuators 110 or lights 114.

Thus, the vehicle computer 106 may be programmed to report new variation definitions, i.e., definitions of variations not currently found in variation definition data, to the remote computer 108. The vehicle computer 106 may be programmed to receive data, from a vehicle 100 user interface, specifying a new variation including audio or textual data received via a user interface, and transmit the received audio or textual data, vehicle 100 data, and environmental data to the remote computer 108. The vehicle 100 data may include data received from one or more vehicle 100 sensors 102, actuators 110, or computers specifying a vehicle 100 operation at a time of reporting the new variation. The remote computer 108 may be programmed to transmit an update of the variation definition data, e.g., including a new variation, to one or more vehicles 100 based on the data received from the vehicle computer 106.

The remote computer 108 may store a table or the like specifying software updates to remediate respective variations, and may be programmed, upon receiving variation data from the vehicle computer 106, to determine whether a software update or a pending software update is available based on a list of stored variations and their respective software updates. Alternatively, the remote computer 108 may determine that no software update is identified based on the detected variation. Alternatively, the remote computer 108 may send a response including data specifying a pending software update for the detected variation. In yet another example, the response may include data specifying an instruction to actuate one or more vehicle 100 actuators 110 including actuating a hazard light 114 to flash or to limit a maximum vehicle 100 speed.

Figure 2A:
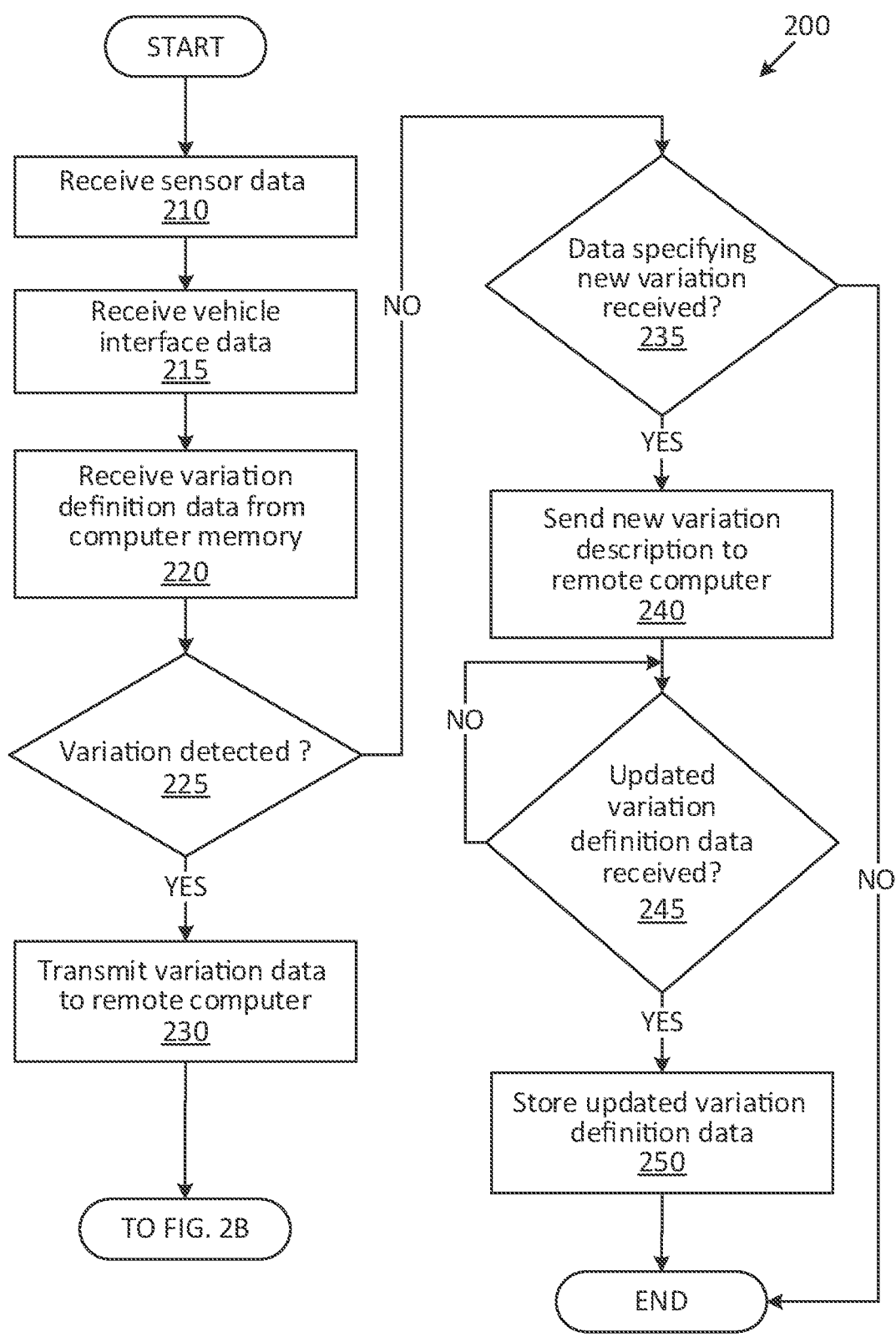
FIGS. 2A and 2B together are a flowchart of an example process for detecting and resolving a variation in a vehicle.
Figure 2B:
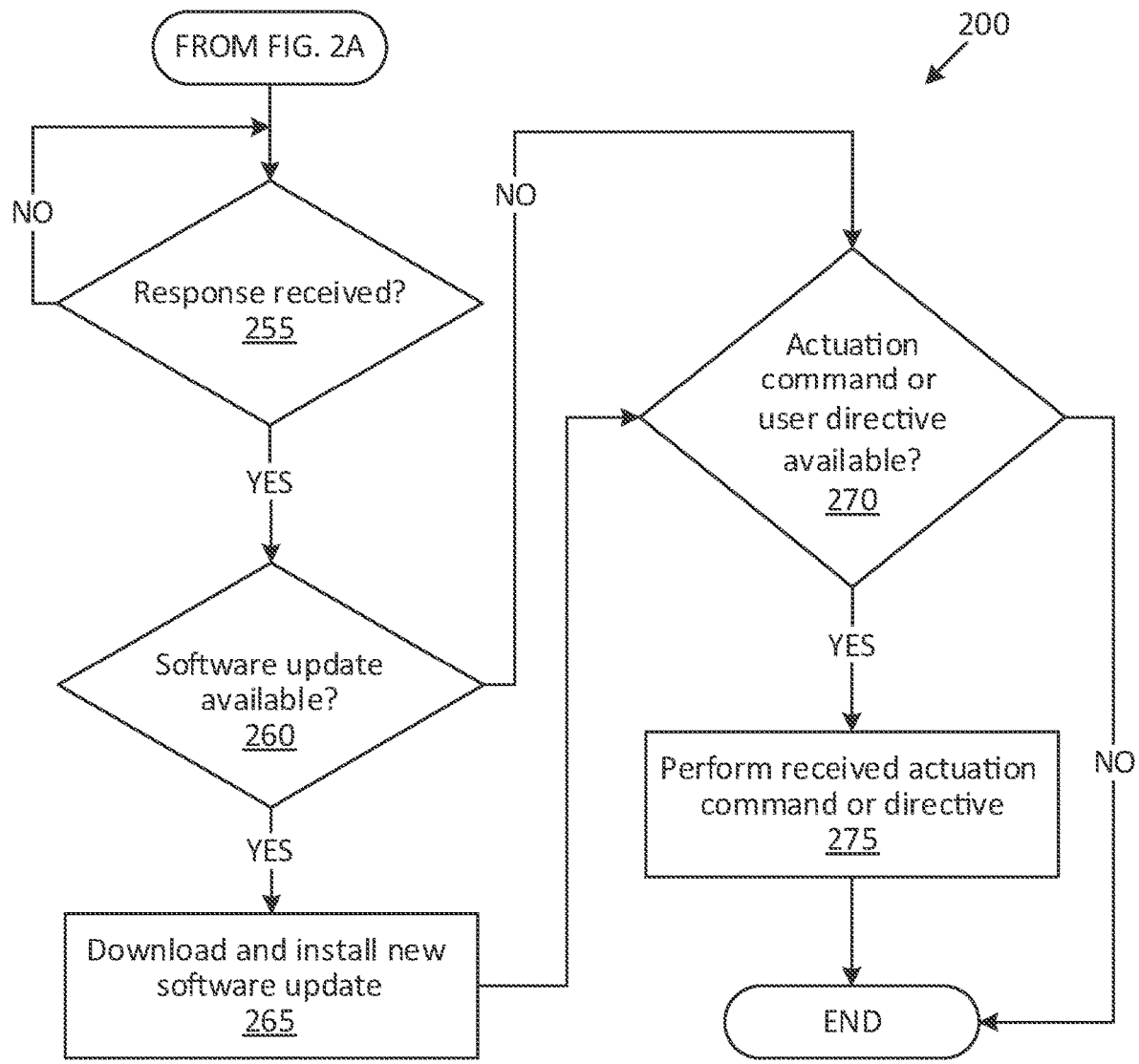

FIGS. 2A-2B are collectively a flowchart of an example process 200 for detecting and resolving a variation in a vehicle 100. A vehicle computer 106 may be programmed to execute blocks of the process 200.

With reference to FIG. 2A, the process 200 begins in a block 210 in which the vehicle computer 106 receives sensor 102 data. The vehicle computer 106 may be programmed to receive data from various sensors 102 providing data such as location, speed, temperature, pressure, audio, video, etc.

Next, in a block 215, the vehicle computer 106 receives data from the vehicle interface 112. The vehicle computer 106 may be programmed to receive data such as textual data, video data, and/or data entered via touchscreen, etc. For example, the textual data may include description of an issue observed by a vehicle 100 user. In another example, audio and/or video data may include description of a problem described by the vehicle 100 user and recorded by the vehicle interface 112.

Next, in a block 220, the vehicle computer 106 retrieves variation definition data from a memory of the vehicle computer 106 and/or another memory in the vehicle 100. The stored variation definition data includes data previously downloaded from a remote computer 108. Additionally or alternatively, the vehicle computer 106 may download the variation definition data from the remote computer 108.

Next, in a decision block 225, the vehicle computer 106 determines whether a variation is detected. The vehicle computer 106 determines based on the stored variation definition data and the vehicle 100 data, e.g., data from the sensors 102, ECUs, etc., whether a variation is detected. If the vehicle computer 106 determines that a variation is detected, then the process 200 proceeds to a block 230; otherwise the process 200 proceeds to a decision block 235.

In the block 230, the vehicle computer 106 transmits variation data to the remote computer 108. For example, with reference to Table 1, the vehicle computer 106 may transmit data indicating that the second variation is detected. Following the block 230, the process proceeds a decision block 250, as shown in FIG. 2B. Note, in some examples, blocks 230, 255, 260 may not be executed by the vehicle computer, because the vehicle computer may store data, e.g., Table 1, specifying one or more respective software updates, directives, and/or actuation commands for the variations. Therefore, the vehicle computer may proceed with identifying the respective actuation, downloading software update, etc., without submitting a request to the remote computer.

In the decision block 235, the vehicle computer 106 determines whether data specifying a new variation has been received. For example, the vehicle computer 106 may determine that data specifying a new variation is received based on data received from a vehicle interface 112, e.g., audio, video, textual data. If the vehicle computer 106 determines that data specifying a new variation is received, then the process 200 proceeds to a block 240; otherwise the process 200 ends, or alternatively returns to the block 210, although not shown in FIG. 2A.

In the block 240, the vehicle computer 106 sends data, e.g., textual, audio, video, etc., describing the new variation to the remote computer 108.

Next, in a decision block 245, the vehicle computer 106 determines whether updated variation definition data is received from the remote computer 108. If the vehicle computer 106 determines that the updated variation definition is received, then the process 200 proceeds to a block 250; otherwise the process 200 returns to the decision block 245, or alternatively the process 200 ends, although not shown in FIG. 2A.

In the block 250, the vehicle computer 106 stores updated variation definition data in a memory of the vehicle computer 106 and/or another memory in the vehicle 100. Following the block 250, the process 200 ends, or alternatively returns to the block 210 although not shown in FIG. 2A.

With reference to FIG. 2B, in the decision block 255, the vehicle computer 106 determines whether a response is received from the remote computer 108. For example, the vehicle computer 106 may be programmed to determine that a response is received when the received data identifies the vehicle 100 with the vehicle 100 identifier and further indicates that is a response to the reported variation. If the vehicle computer 106 determines that a response was received, then the process 200 proceeds to a decision block 260; otherwise the process 200 proceeds to a decision block 260; otherwise the process 200 returns to the decision block 255.

In the decision block 260, the vehicle computer 106 determines whether a software update is available for the detected variation. If the response identifies a software update for the detected variation, then the process 200 proceeds to a block 265; otherwise the process 200 proceeds to a decision block 270.

In the decision block 265, the vehicle computer 106 downloads and installs the identified software update. The software update may include updates to multiple computers and/or ECUs in the vehicle 100. The received response may include data identifying the computers and the respected versions of the software updates. Following the block 265, the process 200 proceeds to the decision block 270. The decision block 270 can be reached from the decision block 260 or the block 265.

In the decision block 270, the vehicle computer 106 determines whether actuation command or user directive is available for the detected variation. The vehicle computer 106 may identify the respective actuation command or directive to output to the vehicle interface 112 based on (i) data stored in the vehicle computer 106 memory, and/or (ii) data included in the received response. If an actuation command and/or directive is available for the variation, then the process 200 proceeds to a block 275; otherwise the process 200 ends, or alternatively returns to the block 210 although not shown in FIGS. 2A-2B.

In the block 275, the vehicle computer 106 performs the identified actuation command and/or the directive. For example, the computer may actuate the hazard lights 114 of the vehicle 100 based on the received actuation command. In another example, the vehicle computer 106 may output a directive via the vehicle interface 112 including a guidance for the vehicle 100 user.

Following the block 275, the process 200 ends, or alternatively returns to the block 210 although not shown in FIG. 2B.

Figure 3:
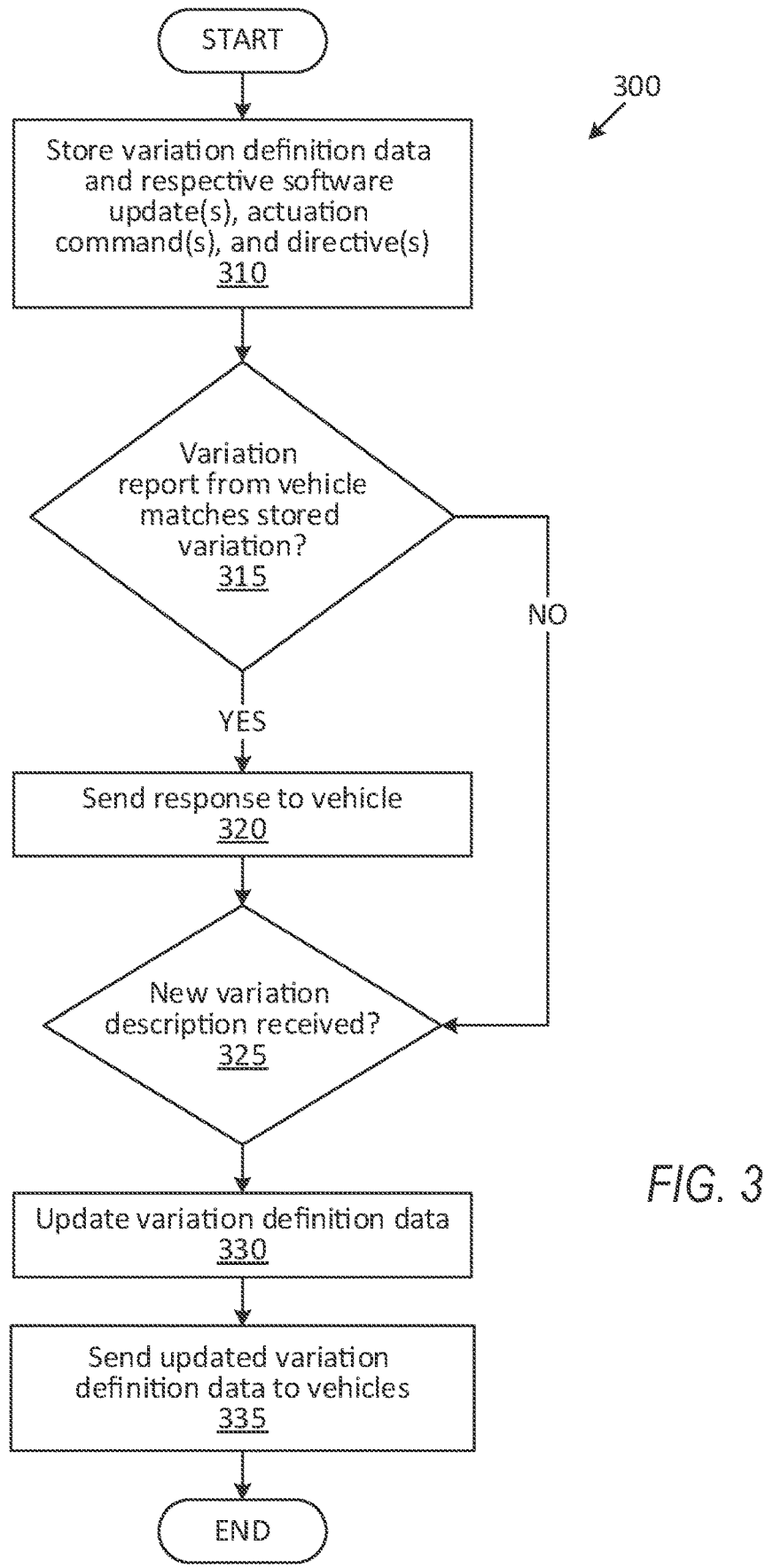
FIG. 3 is a flowchart of an example process for receiving data from a vehicle and providing a response.

FIG. 3 is a flowchart of an example process 300 for receiving data from a vehicle 100 and providing a response. A remote computer 108 with wireless communications to one or more vehicles 100 may be programmed to execute blocks of the process 300.

The process 300 begins in a block 310, in which the remote computer 108 store variation definition data and respective software update(s), actuation command(s), and directive(s) in a memory of the remote computer 108.

Next, in a decision block 315, the remote computer 108 determines whether a variation report is received from a vehicle 100 and matches a stored variation. The received variation data may identify the variation and may further identify the vehicle 100 which sends the variation data. If the remote computer 108 determines that a variation report matches a stored variation, then the process proceeds to a block 320; otherwise the process 300 proceeds to a decision block 325.

In the block 320, the remote computer 108 sends a response to the vehicle 100. The remote computer 108 may identify the response, e.g., software update, directive, actuation command, etc., based on data stored in a memory, e.g., as shown in Table 1. Following the block 320, the process 300 proceeds to the decision block 325. The decision block 325 may be reached from the decision block 315 or the block 320.

In the decision block 325, the remote computer 108 determines whether data describing a new variation is received. If the remote computer determines that data describing a new variation is received, then the process 300 proceeds to a block 330; otherwise the process 300 returns to the decision block 315.

In the block 330, the remote computer updates variation definition data to include the newly described variation data. In some examples, a remote computer user, e.g., a technician, may evaluate the described variation, store a software update that addresses the variation, provides directives, and/or actuation command in a memory of the remote computer.

Next, in a block 335, the remote computer sends the updated variation definition data to vehicles. In one example, the remote computer may identify based on vehicle identifiers which vehicles could be affected by the updated variation data and send the variation definition data to the identified vehicles.

Use of in response to, based on, and upon determining herein indicates a causal relationship, not merely a temporal relationship.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a vehicle computer including a processor and a memory, the memory storing instructions executable by the processor to:
   receive variation definition data, from a remote computer, defining a plurality of variations including one or more of (i) a start-stop operation fails to restart a vehicle engine or (ii) a poor audio quality of a vehicle loudspeaker is detected;
   detect, in a vehicle, one of the plurality of variations, based on data received from one or more vehicle sensors or a vehicle interface;
   transmit, to the remote computer, variation data including the detected variation and a version of software in the vehicle computer, wherein the variation data identifies the detected variation and the version of the software;
   receive, from the remote computer, a response including that a software update is identified based on the detected variation, and actuating one or more vehicle components including a hazard light to flash or to limit a maximum vehicle speed; and
   upon identifying the software update, download and install the software update in the vehicle computer.

2. The system of claim 1, wherein the response further includes data specifying a directive to output audio or visual data to the vehicle interface.

3. The system of claim 1, wherein the variation definition data specifies an unexpected operation of one or more components of the vehicle without a specified diagnostic trouble code.

4. The system of claim 1, wherein the instructions further include instructions to:
   receive data, from a vehicle user interface, specifying a new variation including audio or textual data received via a user interface; and
   transmit the received audio or textual data, vehicle data, and environmental data to the remote computer;
   wherein the remote computer is programmed to transmit an update of the variation definition data based on the received data, wherein the vehicle data includes data received from one or more vehicle sensors, actuators, or computers specifying a vehicle operation at a time of reporting the new variation.

5. The system of claim 4, wherein the vehicle data further includes a software version of one or more vehicle computers.

6. The system of claim 1, wherein the remote computer is programmed, upon receiving the variation data from the vehicle computer, determine whether a software update or a pending software update is available based on a list of stored variations and respective software updates.

7. The system of claim 1, wherein the instructions further include instructions to receive the response including that no software update is identified based on the detected variation.

8. The system of claim 1, wherein the response further includes data specifying a pending software update for the detected variation.

9. A method, comprising:
   receiving variation definition data, from a remote computer, defining a plurality of variations including one or more of (i) a start-stop operation fails to restart a vehicle engine or (ii) a poor audio quality of a vehicle loudspeaker is detected;
   detecting, in a vehicle, one of the plurality of variations, based on data received from one or more vehicle sensors or a vehicle interface;
   transmitting, to the remote computer, variation data including the detected variation and a version of software in the vehicle computer, wherein the variation data identifies the detected variation and the version of the software;
   receiving, from the remote computer, a response including that a software update is identified based on the detected variation, and actuating one or more vehicle components including a hazard light to flash or to limit a maximum vehicle speed; and
   upon identifying the software update, downloading and installing the software update in the vehicle computer.

10. The method of claim 9, wherein the response further includes data specifying a directive to output audio or visual data to the vehicle interface.

11. The method of claim 9, wherein the variation definition data specifies an unexpected operation of one or more components of the vehicle without a specified diagnostic trouble code.

12. The method of claim 9, further comprising:
   receiving data, from a vehicle user interface, specifying a new variation including audio or textual data received via a user interface; and transmitting the received audio or textual data, vehicle data, and environmental data to the remote computer;
wherein the remote computer is programmed to transmit an update of the variation definition data based on the received data, wherein the vehicle data includes data received from one or more vehicle sensors, actuators, or computers specifying a vehicle operation at a time of reporting the new variation.

13. The method of claim 9, wherein the remote computer is programmed, upon receiving the variation data from the vehicle computer, determine whether a software update or a pending software update is available based on a list of stored variations and respective software updates.

14. The method of claim 9, further comprising receiving the response including that no software update is identified based on the detected variation.

15. The method of claim 9, wherein the response further includes data specifying a pending software update for the detected variation.

* * * * *